United States Patent [19]

Arnold et al.

[11] Patent Number: 5,489,074
[45] Date of Patent: Feb. 6, 1996

[54] THERMAL PROTECTION DEVICE, IN PARTICULAR FOR AN AEROSPACE VEHICLE

[75] Inventors: Thibault Arnold, Le Bouscat; Alain Lacombe, Pessac; Michel Tual, Blanquefort, all of France

[73] Assignee: Societe Europeenne de Propulsion, Suresnes, France

[21] Appl. No.: 220,807

[22] Filed: Mar. 31, 1994

[30] Foreign Application Priority Data

Apr. 1, 1993 [FR] France .................................. 93 03830

[51] Int. Cl.⁶ .................................. B64G 1/22; B64C 1/12
[52] U.S. Cl. ..................... 244/158 A; 244/121; 244/132; 52/506.05; 403/408.1; 403/357
[58] Field of Search ................................ 244/158 A, 160, 244/121, 131, 132; 52/506, 513; 403/408.1, 356, 357

[56] References Cited

U.S. PATENT DOCUMENTS

| | | | |
|---|---|---|---|
| 4,308,309 | 12/1981 | Leiser et al. | 244/158 A |
| 4,379,382 | 4/1983 | Sauder | 52/506 |
| 4,439,968 | 4/1984 | Dunn | 52/506 |
| 4,459,261 | 7/1984 | Kolodzey et al. | 376/285 |
| 4,713,275 | 12/1987 | Riccitiello et al. | 244/158 A |
| 5,014,934 | 5/1991 | McClaflin | 244/132 |
| 5,254,837 | 10/1993 | Grimaldi et al. | 244/158 A |
| 5,275,529 | 1/1994 | Langenbrunner et al. | 244/132 |
| 5,314,144 | 5/1994 | Porter, Jr. et al. | 244/132 |

FOREIGN PATENT DOCUMENTS

| | | | |
|---|---|---|---|
| 2657675 | of 0000 | France . | |
| 2586080 | 2/1987 | France | 244/158 A |
| 3243499 | 10/1991 | Japan | 244/158 A |
| 4356300 | 12/1992 | Japan | 244/158 A |
| 530144 | 12/1940 | United Kingdom . | |
| 2082245 | 3/1982 | United Kingdom . | |

*Primary Examiner*—Andres Kashnikow
*Assistant Examiner*—Virna Lissi Mojica
*Attorney, Agent, or Firm*—Weingarten, Schurgin, Gagnebin & Hayes

[57] ABSTRACT

The thermal protection device is made up of a plurality of juxtaposed unit modules each comprising a fairing element provided with fixing tabs and thermal insulation integrated in the fairing element. The gap between neighboring fairing elements is limited to the minimum width necessary for accommodating thermal expansion thereof. The connection means which releasably connect the fixing tab to a primary structure to be protected comprise a ball fixed to the fixing tab in adjustable manner and capable of being locked in a corresponding socket of a retaining part fixed to the primary structure. The ball is locked in its socket by means of a bolt capable of being released by action exerted against a resilient return force.

10 Claims, 5 Drawing Sheets

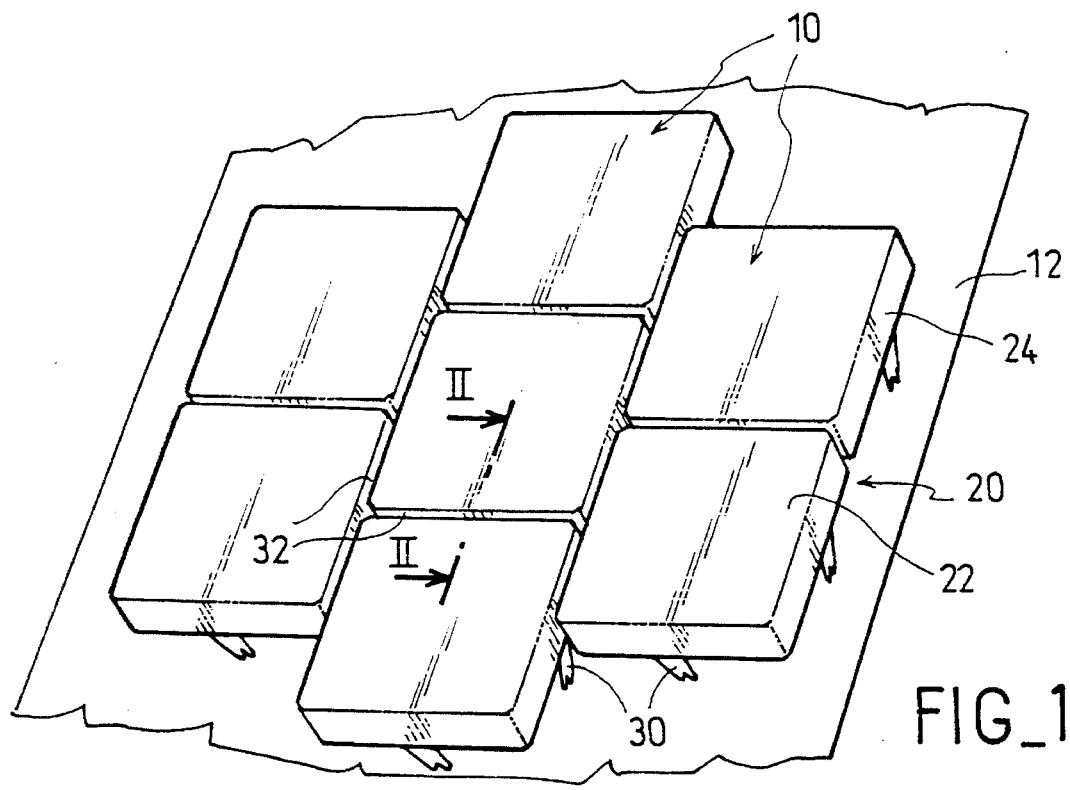
FIG_1
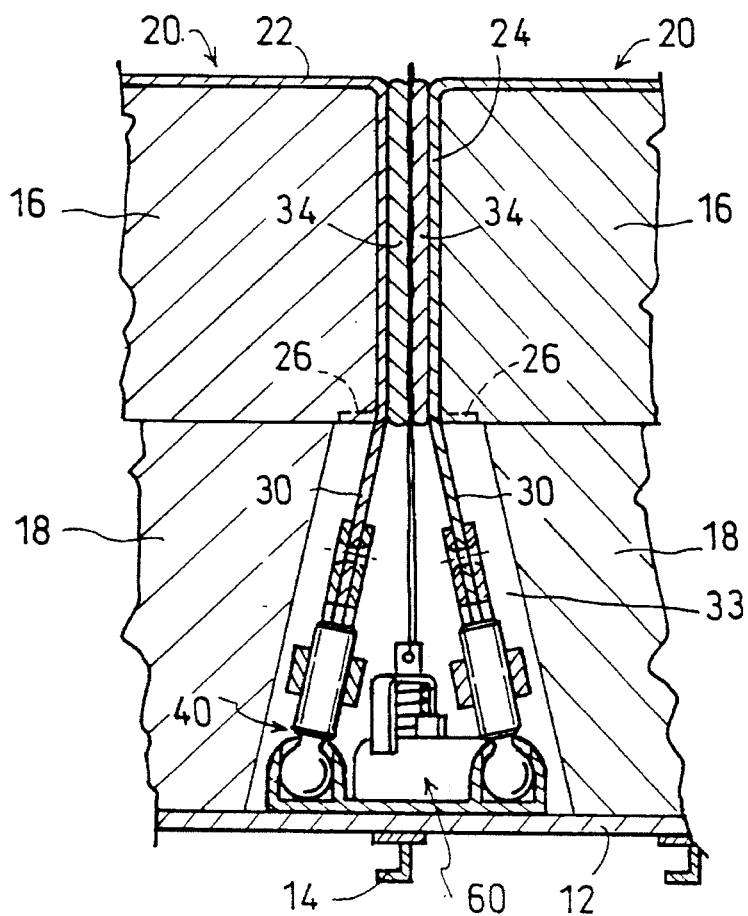
FIG_2

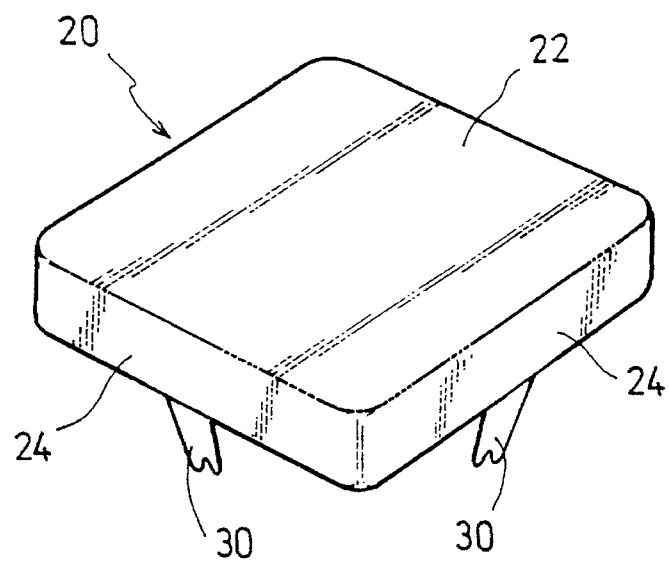
FIG_3
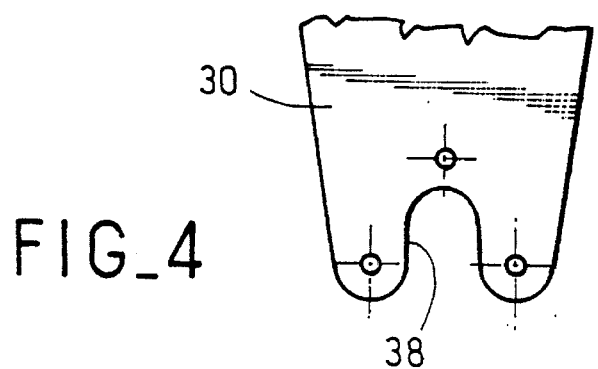
FIG_4
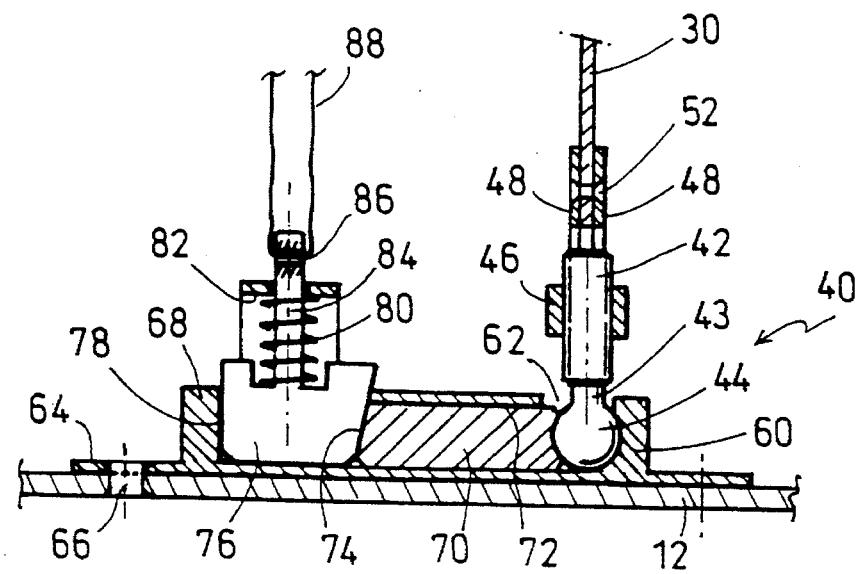
FIG_6

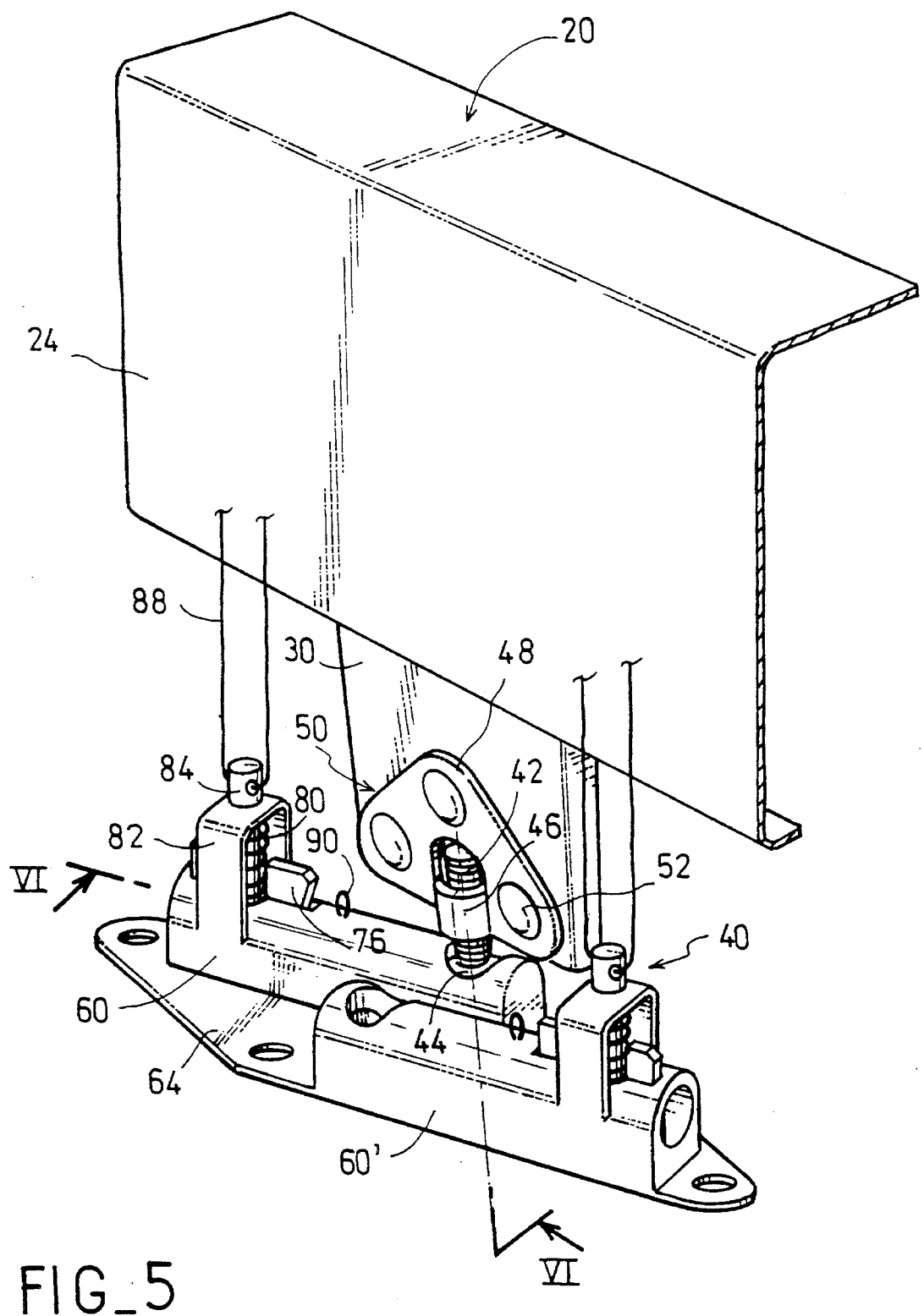
FIG_5

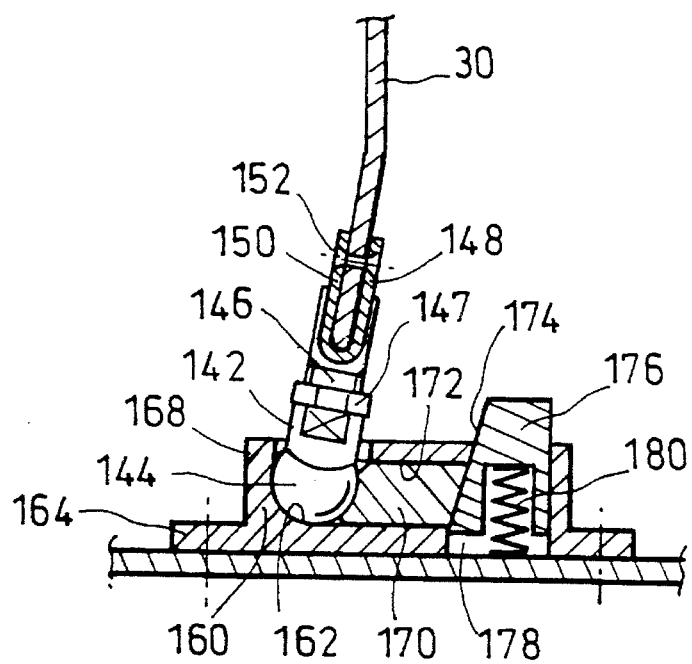
FIG_7
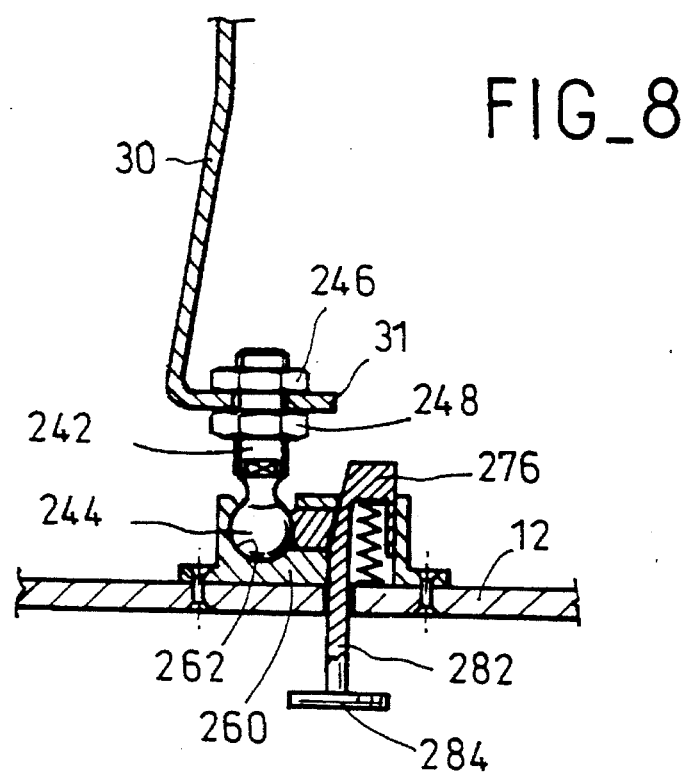
FIG_8

FIG_9
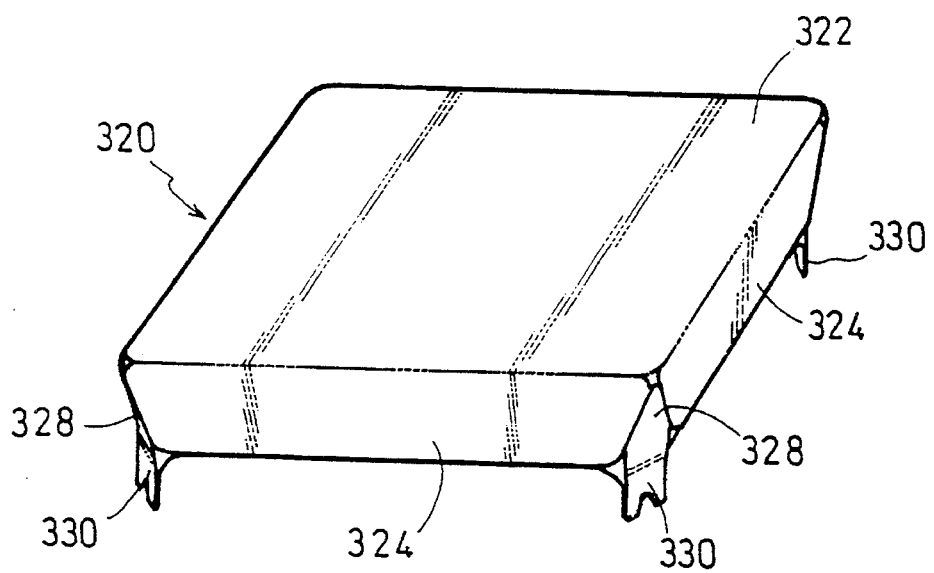
FIG_10
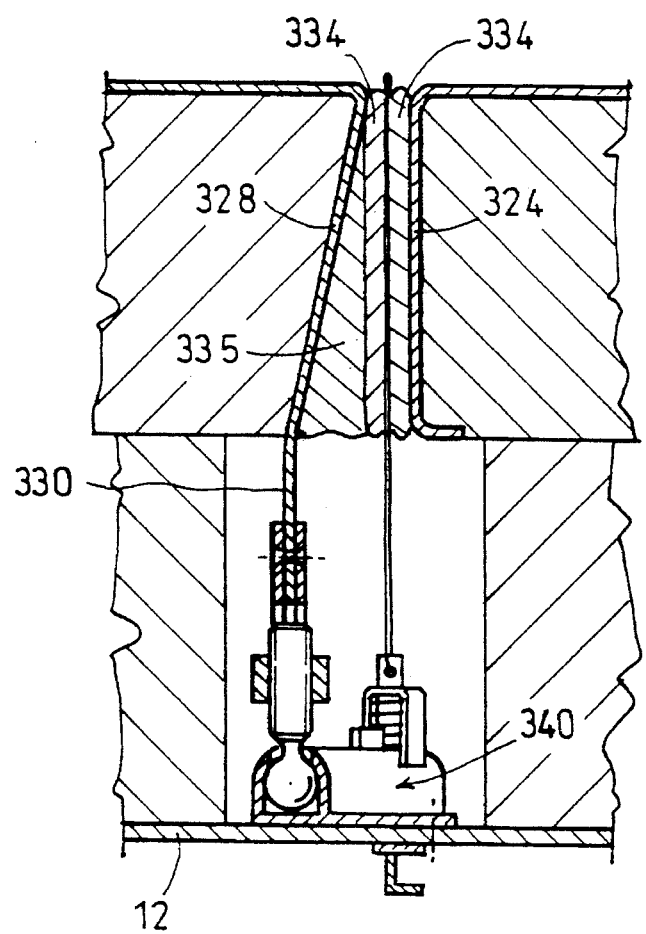

THERMAL PROTECTION DEVICE, IN PARTICULAR FOR AN AEROSPACE VEHICLE

The present invention relates to a thermal protection device, intended most particularly for a space vehicle or an aircraft, e.g. an atmospheric re-entry body, a space plane, or a hypersonic airplane. This field of application is not exclusive, and the invention could also be used, for example, in hot air furnaces that use air at very high temperature.

A thermal protection device for an aerospace vehicle must protect the internal structure of the vehicle against overheating, in particular during re-entry into the atmosphere, while also performing an aerodynamic function.

BACKGROUND OF THE INVENTION

To this end, it is known to provide thermal protection in the form of juxtaposed unit modules or "tiles" that are fixed on an internal primary structure to be protected of the vehicle. When the vehicle is reusable (space plane or hypersonic airplane), the fixing of the modules must be designed so as to allow a damaged module to be replaced without too much difficulty.

Proposals are made in document FR-A-2 657 675 to provide thermal protection for a space plane by means of juxtaposed quadrangular tiles. Each tile includes a fairing element made of ceramic matrix composite material and a thermal insulator disposed inside the fairing element. This has fixing tabs that are connected to the primary structure to be protected by straps and screws. Such a tile is dismounted by poking a tool by deforming flexible gaskets provided between adjacent tiles.

That known solution does indeed enable a damaged tile to be replaced from the outside, but it presents drawbacks.

Thus, it is necessary to provide a gap of sufficient size between adjacent tiles for it to be possible to pass and drive the tool required for unscrewing the coupling means between the fairing and the fixing strap secured to the primary structure. Even though this gap is filled by means of a gasket, the aerodynamic function of juxtaposed tiles and their thermal protection function are thereby degraded, and any damage to the gaskets, e.g. during assembly, is particularly harmful for these two functions.

In addition, it is necessary between the fairing elements, the straps and the primary structure to insert spacers and washers of thickness that is fitted on demand in order to correct for inevitable defects of shape in these various parts and to ensure continuity of the aerodynamic shape of the aerospace vehicle, thereby making the thermal protection heavier and more complex.

Furthermore, the shape of the gap required for receiving the fixing means between the fairing elements is such that it requires a gasket whose right cross-section is in the form of a varying trapezium, and that is difficult to make.

In addition, differences in thermal expansion between the fairing elements and the primary structure give rise to harmful mechanical stresses at the fastenings.

A support structure for a very high temperature reactor is also known from patent U.S. Pat. No. 4,459,261, which structure comprises link members between the graphite wall of the reactor and a lateral heat shield situated outside the reactor. The link members are constituted by elastically deformable rods that extend horizontally across the gap between the reactor wall and the heat shield to which they are connected by ball-and-socket joints.

Such a structure acts in compression against the wall of the reactor and enables dimensional variations in the horizontal and vertical directions to be accommodated. However, it does not constitute a modular structure enabling a portion of the wall to be removed and replaced easily. In addition, it is necessary, at least on the side of the reactor wall, to provide a ball-and-socket connection that is capable of withstanding high temperatures. Furthermore, the use of resilient link members cannot be entertained when the outside structure needs to be undeformable, which happens to be the case, in particular, for a space plane because of the aerodynamic function that the thermal protection elements must perform.

OBJECT AND BRIEF SUMMARY OF THE INVENTION

Thus, the present invention seeks to provide thermal protection that is particularly suitable for space vehicles or airplanes, and more precisely thermal protection in the form of interchangeable juxtaposed modules that do not suffer from the drawbacks of the state of the art as described above.

This object is achieved by a thermal protection device, in particular for an aircraft or a space vehicle, the device comprising a plurality of juxtaposed unit modules each comprising a fairing element provided with fixing tabs, thermal insulation integrated in the fairing elements, and rigid connection means for releasably connecting the fixing tabs to a primary structure that is to be protected, in which device, according to the invention, the gap between neighboring fairing elements is limited to a value substantially equal to the minimum value necessary for accommodating thermal expansion of the fairing elements, and the rigid connection means for connecting a fixing tab of a module to the primary structure comprise a ball fixed to the fixing tab in adjustable manner and capable of being locked inside a corresponding socket of a retaining part fixed to the primary structure, the ball being locked in its socket by means of a bolt capable of being released by action exerted against a resilient return force, e.g. from a spring. It then suffices to act on the spring to release the bolt and allow the ball to be inserted into its socket or to be extracted therefrom.

Preferably, the locking bolt is movable in a direction substantially perpendicular to the direction of the resilient return force exerted by the spring, with the spring acting on the bolt via a part having a face on which the bolt bears. The part may be in the form of a wedge, for example, having a face that forms a self-locking ramp against which the bolt bears. As a result, the ball cannot escape resiliently from its socket under the effect of traction applied to the fairing element.

In a first embodiment of the device of the invention, the ball-locking bolt may be released by a traction force exerted on the spring from outside the thermal protection. This may be achieved by means of a wire that is permanently installed in the gap between two fairing elements of adjacent modules, the wire being suitable for withstanding the thermal conditions that are present in the gap.

In a second embodiment, the bolt may be released by thrust achieved from the outside by means of a thin blade-shaped tool that is inserted into the gap between two fairing elements of adjacent modules.

In a variant, access may be provided to the spring from inside the primary structure.

In any event, the gap between the fairing elements of adjacent modules can be very small, thus making it possible to restrict it to the value that is required to allow free thermal expansion of the fairing elements. These can therefore provide their aerodynamic and thermal protection functions to best effect.

In addition, because of the ball-and-socket connection, the stresses induced in the fixing tabs by differential thermal expansion between the fairing elements and the primary structure are less than in the prior art disposition because the ball-and-socket link has a lower degree of redundancy.

The position of the ball relative to the fixing tab to which it is fixed may be adjusted, e.g. by screwing a ball support in or out along an axis thereof. This adjustment facility makes it possible to relax manufacturing and assembly tolerances in the primary structure and in the fairing elements while still making it possible for the positions of the fairing elements to be adjusted so as to bring them very close to the desired aerodynamic shape.

The fairing elements preferably have an outside face that is polygonal in shape, e.g. in the form of a quadrangle, and the fixing tabs are situated in the middles of the sides of the fairing elements and extend inwards away from the outside face. By means of this disposition, thermal expansion differences between the fairing elements and the primary structure can be converted into resilient deformations of the fixing tabs which give rise to smaller amounts of harmful mechanical stress.

BRIEF DESCRIPTION OF THE DRAWINGS

The invention will be better understood from reading the following description given by way of non-limiting illustration and made with reference to the accompanying drawings, in which:

FIG. 1 is a highly diagrammatic fragmentary overall view of a thermal protection device;

FIG. 2 is a fragmentary diagrammatic view in section and on a larger scale on plane II of FIG. 1, showing one disposition for a thermal protection device in accordance with the invention;

FIG. 3 is a perspective view of a fairing element of the FIG. 2 thermal protection device;

FIG. 4 is a detail view on a larger scale showing the end portion of a fixing tab of the FIG. 3 fairing element;

FIG. 5 is a detailed view in perspective showing the ball-and-socket connection between a fixing tab and the primary structure to be protected;

FIG. 6 is a section view on plane VI of FIG. 5;

FIGS. 7 and 8 are section views through variant embodiments of the ball-and-socket connection between a fixing tab and the primary structure to be protected;

FIG. 9 is a perspective view of another embodiment of a fairing element; and

FIG. 10 is a section view through a ball-and-socket connection between a fixing tab for the FIG. 9 fairing element and the primary structure to be protected.

MORE DETAILED DESCRIPTION

As shown in FIGS. 1 and 2, a thermal protection device, e.g. for a space plane or a hypersonic airplane is formed by juxtaposed similar unit modules 10 that are disposed in a mosaic. The modules are fixed to a primary structure to be protected 12, in the present case the outside structure of the airplane which is fitted with stiffening members 14.

Each unit module 10 comprises a fairing element 20 in the form of an open box having a quadrangular outside face 22, e.g. a square outside face, and flanks 24 extending perpendicularly to the face 22 and having ends 26 that are folded inwards. As can be seen more clearly in FIG. 3, the flanks 24 are extended in their middles by fixing tabs 30 which slope towards the inside of the box, making an angle of a few degrees (about 10°) relative to the normal to the face 22.

The fairing elements 20 are made of a material that is capable of withstanding high operating temperatures, typically of the order of 800° C. to 1500° C. for a space plane. This material may be a ceramic matrix composite material (CMC) such as a material constituted by a carbon fiber reinforcing fabric densified by a matrix of silicon carbide. Techniques for fabricating CMCs are well known. In particular, the fiber reinforcement may be made so as to constitute a preform by draping plies of two-dimensional or multilayer fabric on tooling in order to give the reinforcement the open box shape 20. The preform may be densified by means of the ceramic matrix by chemical vapor infiltration and/or by impregnation using a liquid precursor for the matrix and transforming the precursor into ceramic by heat treatment.

The dimensions of the fairing elements, with respect to their faces 22 are limited so that when they are juxtaposed they constitute a surface having the desired aerodynamic properties, while still being sufficiently large to avoid the need for a large number of small elements complicating problems associated with assembly and fixing. Typically, the faces 22 for providing thermal protection on a space plane or a hypersonic airplane may be squares each having a side of a few tens of centimeters. It will also be observed that arbitrary shapes other than square, e.g. polygonal shapes could be used for the fairing elements, with the number and location of the fixing tabs being adapted accordingly.

The inside of each fairing element 20 is filled with a thermal insulator 16 (FIG. 2). The material used for the insulator 16 is a low-density material, e.g. a material made up of ceramic sheets provided with a reflecting metal coating, as described in French patent applications numbers 2 611 251 and 2 657 414, or a felt of alumino-silicate fibers. It is also possible to make the insulator in the form of a rigid block of porous ceramic, e.g. a block of a ceramic of the alumino-silicate type, optionally reinforced with short fibers. Under such circumstances, the insulating block may be used as tooling on which the preform of the composite fairing element is made, as described in French patent application No. 93 02 703, filed Mar. 9, 1993 by the Applicant.

The thickness of the insulator 16 corresponds to the width of the flanks 24 of the fairing element. The quality of the insulator is selected as a function of the temperature levels encountered. For the application envisaged to a space plane or a hypersonic airplane, and using an insulator constituted by a felt of alumino-silicate fibers, a thickness of a few centimeters is desirable, e.g. a thickening lying in the range 2 cm to 10 cm.

Ball-and-socket connection devices 40 (not shown in FIG. 1, but described in greater detail below), serve to connect the fixing tabs 30 to the primary structure 12. In the example shown, the fixing tabs 30 are made of the same material as the fairing element 20 and they are integrally formed therewith. If possible, given the operating temperature, the fixing tabs may be constituted by metal parts that are added on, e.g. by being riveted to the flanks 24.

The fixing tabs 30 and the connection devices 40 define a gap between the fairing elements 20 filled with insulator 16 and the primary structure 12. This gap is filled with an insulator 18, e.g. of the same kind as the insulator 16. The insulator 18 may be stuck to the primary structure, and its thickness is selected to perform a safety function in the event of a fairing element being torn off.

A gap 32 (FIG. 1) is left between adjacent flanks of neighboring fairing elements solely to accommodate dimensional variations due to thermal expansion. The gap 32 is lined with a gasket made of a non-rigid material that withstands high temperatures. It is possible to use a material identical to that of the insulator 16, e.g. a felt or a cloth of alumino-silicate fibers. A gasket between two fairing elements is actually built up from two portions 34 that are stuck respectively to the outside surfaces of the flanks of said two elements, by using ceramic adhesion (FIG. 2).

The gasket made in this way occupies substantially all of the volume available between fairing elements. It serves firstly to provide continuity of the outside surface of the fairing elements and secondly to provide thermal insulation for the connection devices 40 against the outside environment. Stopping (not shown) constituted by fibers in the form of a carding web or felt may be provided in the space 33 around the fixing tabs 30 and the connection devices 40 in order to prevent hot gases passing due to the effect of a volume under reduced pressure, and also to ensure continuity of the insulation 18.

A ball-and-socket connection device 40 is shown in greater detail in FIGS. 5 and 6. The component parts of the connection device are parts made of metal.

A threaded rod 42 provided with a ball 44 at one end is screwed into a ring 46. The ring is integrally formed with two plates 48 of a support part 50 which is fixed to the end of a fixing tab 30. To this end, the tab has a central cutout 38 in its end (FIG. 4) for receiving the ring 46 while the end of the connection tab 30 is sandwiched between the plates 48 which are fixed thereto by rivets 52.

The ball 44 is received in a socket 62 of complementary shape in a ball-retaining part 60. This part comprises a base 64 which is fixed to the primary structure by rivets 66 and on the base a body 68 in which the socket 62 is formed. A retaining bolt 70 is capable of sliding in a bore 72 which opens out laterally into the socket 62. The bolt 70 has a concave end in the form of a spherical cap which is pressed against the ball 44 and fits snugly around the shape thereof. At its other end, the bolt 70 bears against a ramp 74 of a keeper 76. The keeper can slide in a passage 78 formed in the part 60 and is subject to the action of a spring 80. The spring exerts a return force on the keeper 76 which, via the ramp 74, tends to urge the ramp 70 so that it locks the ball 44 in the socket 62. By the wedging effect, this disposition ensures that in the absence of external action on the keeper 76, locking is irreversible. Since the bolt 70 is movable in translation perpendicularly to the action of the spring, the ball 44 cannot escape resiliently merely by applying traction to the rod 42.

The return force exerted by the spring 80 on the keeper 76 is directed inwards, i.e. towards the primary structure 12. The spring 80 bears against an arch 82 disposed above the body 68. The keeper 76 is provided with a shank 84 surrounded by the spring 80 and having its top end projecting through a hole formed in the arch 82. The top end of the shank 84 has a hole 86 passing right through the shank transversely and through which a loop of wire 88 is threaded. The wire extends into the gap between adjacent modules, between the two portions of gaskets 34 in such a manner as to be easily accessible from outside the thermal protection.

A safety locking system may be provided, e.g. in the event of the spring 80 failing, which locking system may be constituted by a resilient split pin 90 (shown only in FIG. 5) that prevents the bolt 70 from moving in translation. The pin may be removed by means of a wire analogous to the wire 88.

The ball 44 is released by applying traction to the shank 84 of the keeper 76 by means of the wire 88 or by engaging a hook in the gap between the two portions of the gasket 34. If a safety pin is present, it must initially be withdrawn in the same manner. Such traction can easily be exerted from outside the thermal protection without damaging the gasket 34. The width of the gap 32 between the neighboring fairing elements is thus restricted to the width that is Just large enough to accommodate thermal expansion, i.e. about 1 mm in the intended application. In the embodiment shown in FIGS. 1 to 6, the gap 32 is of constant width, thereby simplifying manufacture of the gasket 34. Since the gasket is flat and thin, various different materials can be used, e.g. mere cloth. In some cases, the gap 32 may be so narrow as to provide the option of omitting the gasket 34 altogether.

This advantage is combined with the great simplicity with which a thermal protection module can be put into place and can be removed. In addition, the presence of balls at the ends of threaded rods 42 engaged in rings 46 makes it possible to vary the distance between the fixing tabs and the balls merely by screwing the rods 42 in or out, thereby accurately adjusting the position of the fairing elements in order to obtain the desired aerodynamic shape. This adjustment facility makes it possible to compensate for dimensional defects in the primary structure, in the fairing elements, and in the connection devices, and also to accept larger manufacturing tolerances for these various parts. Finally, the presence of a portion 43 of smaller section between the rod 42 and the ball 44 considerably limits heat transfer by conductivity between the fairing elements and the primary structure.

By disposing the fairing elements in a staggered configuration (FIG. 1), the fixing tabs on two of the opposite sides of an element are situated facing the fixing tabs of neighboring elements, whereas the fixing tabs on the other two sides are situated facing gaps between neighboring elements.

In the first case, the ball-and-socket connection devices comprise two identical retaining parts 60 and 60' mounted head to tail on a common base 64 as shown in FIG. 5.

In the second case, only one retaining part is provided.

In both cases, the retaining parts are disposed in such a manner that the controlling shanks such as the shank 84 are disposed substantially directly beneath the gap between the two gasket portions 34, with the wire 88 thus extending substantially perpendicularly to the primary structure.

FIGS. 7 and 8 show variant embodiments of the ball-and-socket connection.

In FIG. 7, the ball 144 is fixed to one end of a hollow sleeve 142 screwed onto a threaded rod 146 and locked in position on the rod by means of a nut 147. The rod is secured to a support part 150 having two plates 148 that sandwich the end of the fixing tab 30 and that are fixed thereto by rivets 152.

The ball 144 is received in a socket 162 of complementary shape in the retaining part 160. This part comprises a base 164 fixed to the primary structure by rivets and carrying a body 168 in which the socket 162 is formed. A retaining bolt 170 (analogous to the bolt 70 of FIG. 6) is slidably mounted in a bore 172 which opens out into the socket 162. At its end opposite from the end bearing against the ball 144, the bolt 170 bears against a ramp 174 of a keeper 176. The keeper is slidably mounted in a passage 178 formed through the part 160 and is subjected to the action of a spring 180. The spring exerts a return force on the keeper 176 which, via the ramp 174 tends to urge the bolt 170 so that it locks the ball 144 in its socket.

A locking effect by means of wedging is thus obtained, as in the embodiment of FIGS. 5 and 6, but in this case the ramp 144 slopes in the opposite direction from the ramp 44 and the return force exerted by the spring 180 on the keeper 176 is directed outwards from the primary structure.

Thus, the ball is unlocked, not by traction, but by applying thrust on the end of the keeper 176 which projects through the top of the body 160. Similarly, pressure on the keeper 176 enables the ball 144 to be engaged in the socket 162 by pushing back the bolt 170. Such pressure can be exerted from outside the thermal protection by means of a thin tool, e.g. in the form of a blade engaged between the two gasket portions 34. Here again, the width of the gap between the fairing elements is equal to the smallest width that is acceptable for accommodating thermal expansion. The retaining part 160 is located in such a manner as to ensure that the top portion of the keeper 176 lies immediately beneath the middle of the gap between two adjacent fairing elements.

In the example of FIG. 8, the fixing tab 30 has its end folded through a right angle, e.g. outwardly, thus forming a flange 31. The ball 244 is situated at one end of a threaded rod 242 whose other end passes through a hole formed in the flange 31. The rod 242 is locked relative to the fixing tab by means of two nuts 246, 248 situated on either side of the flange 31.

The ball 244 is engaged in a socket 262 of a retaining part 260 analogous to that shown in FIG. 7, the only difference lying in the fact that the keeper 276 is extended at its bottom end by means of a drive rod 282 that passes through a passage formed in the primary structure 12 and that terminates in a button 284.

In this case, the keeper 276 is driven to unlock the bolt 270 acting on the ball 244 by applying traction to the button 284 from inside the primary structure 12. No tooling is required for gaining access to the keeper 276 from outside the thermal protection.

It may be observed that drive could be applied from inside the primary structure not only in traction, but also in thrust, by using a connection device of the type shown in FIGS. 5 and 6.

In the embodiments of FIGS. 7 and 8, as in the embodiment of FIGS. 5 and 6, the distance between the ball and the fixing tab is adjustable by screwing the ball in or out in order to set the position of the fairing element.

The fairing element 20 of FIG. 3 is provided with fixing tabs situated in the middles of its sides. That disposition serves to minimize troublesome mechanical stresses in the fixing tabs that result from differences in thermal expansion between the fairing element and the primary structure.

Nevertheless, it would also be possible to place the fixing tabs at the corners of the fairing element, as shown in FIGS. 9 and 10. The fairing element 320 is in the form of a box with a substantially square outside face 322 and with flanks 324 whose ends slope inwards. The flanks 324 are connected to one another at the corners of the box 320 by plane surfaces forming facets 328 that slope towards the inside of the box at an angle of a few degrees (about 10°) relative to the face 322. Beyond the flanks 324, the facets 328 are extended by fixing tabs 330 that extend perpendicularly to the face 322. The fixing tabs 330 are oriented so as to be perpendicular to the planes that are normal to the face 322 and that contain the diagonals thereof.

The presence of facets 328 in the corners of the fairing element may make it necessary to provide corner stopping 335 in the corners in addition to the gasket 334 of uniform thickness.

The connection between a fixing tab 330 and the primary structure 12 is provided by a ball-and-socket connection device 340, e.g. analogous to that shown in FIGS. 5 and 6.

We claim:

1. A thermal protection device, in particular for an aircraft or a space vehicle, the device comprising a plurality of juxtaposed unit modules each comprising a fairing element provided with fixing tabs, thermal insulation integrated in the fairing elements, and rigid connection means for releasably connecting the fixing tabs to a primary structure that is to be protected, wherein the gap between neighboring fairing elements is limited to a value substantially equal to the minimum value necessary for accommodating thermal expansion of the fairing elements, and the rigid connection means for connecting a fixing tab of a module to the primary structure comprise a ball fixed to the fixing tabs in adjustable manner and capable of being locked inside a corresponding socket of a retaining part fixed to the primary structure, the ball being locked in its socket by means of a bolt capable of being released by action exerted against a resilient return force.

2. A device according to claim 1, wherein the locking bolt is movable in a direction substantially perpendicular to the direction of the resilient return force, which force acts on a keeper having a face that forms a self-locking ramp against which the locking bolt bears.

3. A device according to claim 2, wherein the locking bolt is released by applying traction on said keeper from outside the thermal protection device through a gap between neighboring unit modules.

4. A device according to claim 3, wherein the traction is exerted by means of a wire permanently fixed to said keeper and extending through said gap.

5. A device according to claim 2, wherein the locking bolt is released by applying thrust on said keeper from outside the thermal protection device through a gap between neighboring unit modules.

6. A device according to claim 2, wherein the locking bolt is released by acting on said keeper from inside the primary structure.

7. A device according to claim 1, wherein the ball is fixed to the fixing tab in a manner that is adjustable by screwing a part carrying the ball in or out, thereby enabling the distance between the fixing tab and the ball to be varied so as to adjust the position of the fairing element as a function of the desired aerodynamic shape independently of dimensional faults in the fairing elements, in the primary structure, and in the connection means.

8. A device according to claim 1, wherein each fairing element is in the form of an open box having an outside face and flanks perpendicular to said outside face.

9. A device according to claim 1, wherein each fairing element has a polygonal outside face and the fixing tabs are situated in the middles of the sides of the fairing elements.

10. A device according to claim 1, wherein each fairing element has a quadrangular outside face and the fixing tabs are situated in the corners of the fairing elements and extend away from the outside face, being perpendicular to planes that are normal to the outside face and that contain the diagonals thereof.

* * * * *